350-376 SR

XR 3,582,183

[redacted]

United States Patent [11] 3,582,183

[72] Inventor Uwe Schmidt
Pinneberg, Germany
[21] Appl. No. 780,745
[22] Filed Dec. 3, 1968
[45] Patented June 1, 1971
[73] Assignee U.S. Philips Corporation
New York, N.Y.
[32] Priority Oct. 30, 1968
[33] Germany
[31] P1805926.2

[54] OPTICAL MASS STORE
10 Claims, 9 Drawing Figs.

[52] U.S. Cl. ........................................................ 350/150,
340/173.2, 340/174.1, 350/151, 350/160
[51] Int. Cl. ........................................................ G02f 3/00
[50] Field of Search ........................................... 350/147,
150, 151, 160; 340/173.2 SS, 174.1 MC

[56] References Cited

UNITED STATES PATENTS

| | | | |
|---|---|---|---|
| 2,951,736 | 9/1960 | Black ........................... | 350/96UX |
| 3,342,539 | 9/1967 | Nelson et al. ................. | 350/150 |
| 3,368,209 | 2/1968 | McGlauchlin et al. ....... | 350/151UX |
| 3,438,692 | 4/1969 | Tabor.......................... | 350/157 |
| 3,440,620 | 4/1969 | French ........................ | 350/150UX |

OTHER REFERENCES

Kosanke et al. " Optical Read and Write Device Using Electro-Optical Logic" IBM Tech. Discl. Bull. Vol. 6, No. 10 (Mar. 1964) pp. 61— 62.

Mee " Magneto-Optical Readout Technique" IBM Tech. Discl. Bull. Vol. 9, No. 9 (Feb. 1967) pp. 1155.

*Primary Examiner*—David Schonberg
*Assistant Examiner*—Paul R. Miller
*Attorney*—Frank R. Trifari

ABSTRACT: An optical mass store uses a beam deflector to position a first beam within an angular range and an image multiplier to form the deflected beam into N angularly separated additional beams scanning in synchronism with the first beam. The mutually synchronized additional beams are used to read out memory elements at a rate N times the rate of optical store employing a single unmultiplied beam.

INVENTOR.
UWE SCHMIDT

BY [signature]
AGENT

INVENTOR.
UWE SCHMIDT
BY
AGENT

INVENTOR.
UWE SCHMIDT
BY Frank R. Trifari
AGENT

INVENTOR.
UWE SCHMIDT
BY
AGENT

OPTICAL MASS STORE

The invention relates to an optical mass store having a storage plane divided into storage elements, which store has a high storage density, a large storage capacity and a short access time. Many methods have been proposed of dealing with the problem of the mass store, that is to say a store containing at least $10^7$ bits. However, all solutions which have hitherto become known have in common that they cannot simultaneously fulfil the fundamental requirements to be satisfied by a mass store, namely a storage density of about $10^7$ bits per sq. cm., an access time of $10^{17}$ second and a storage capacity of at least $10^7$ bits. The present invention provides a solution which enables all these three requirements to be satisfied.

The invention is characterized in that a controllable electro-optical light deflector succeeded by an optical multiplying system is provided for sweeping an optical scanning beam composed of subbeams over the storage plane.

An optical beam first passes through a light-beam deflector, preferably a digital light-beam deflector, that is to say a light-beam deflector which is controllable in steps and comprises a cascade arrangement of birefringent prisms and polarization switches, and then passes through an image multiplying optical system providing N-tuple multiplication and finally, under the control of the light-beam deflector, simultaneously scans N squares on a storage plane, the resulting optical signals being picked up by photodetectors for further data processing.

Figure 1:
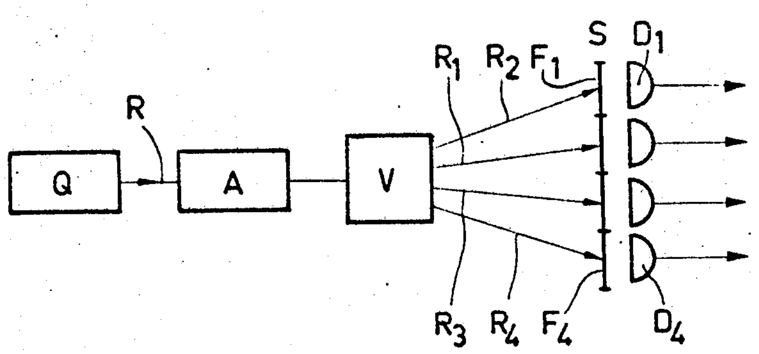
Figure 2:
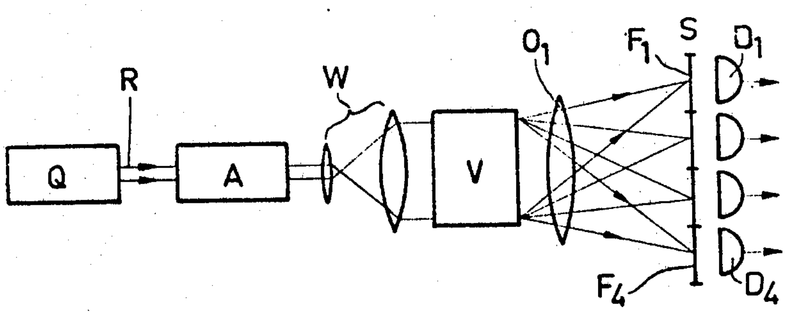
Figure 3A:
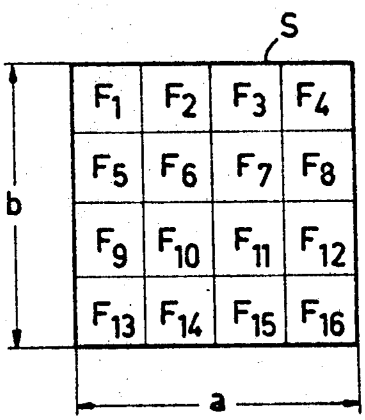
Figure 3B:
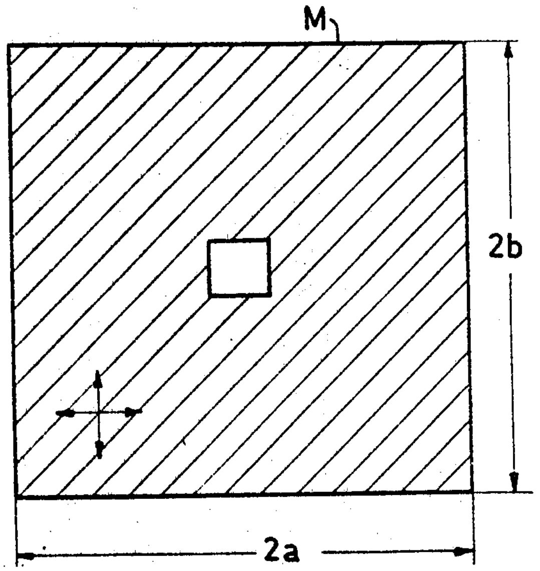
Figure 4:
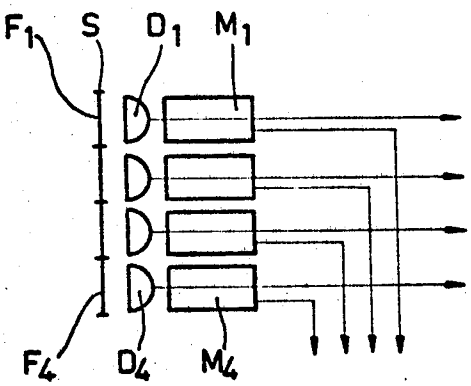
Figure 5:
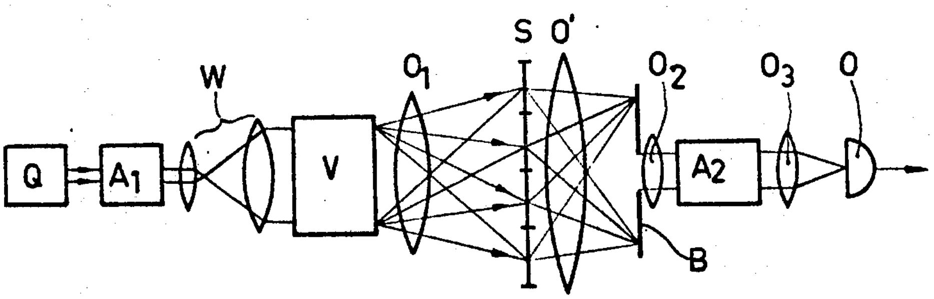
Figure 6:
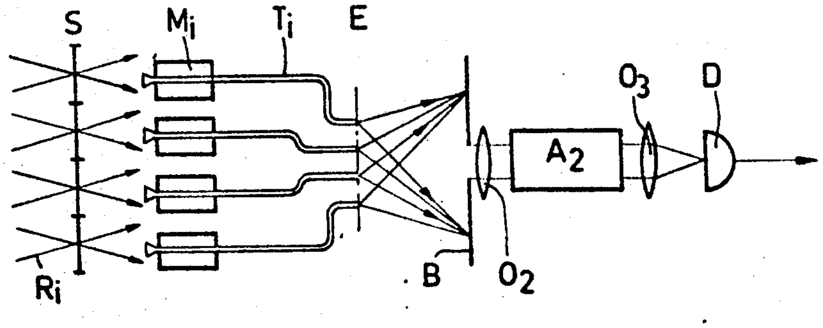
Figure 7:
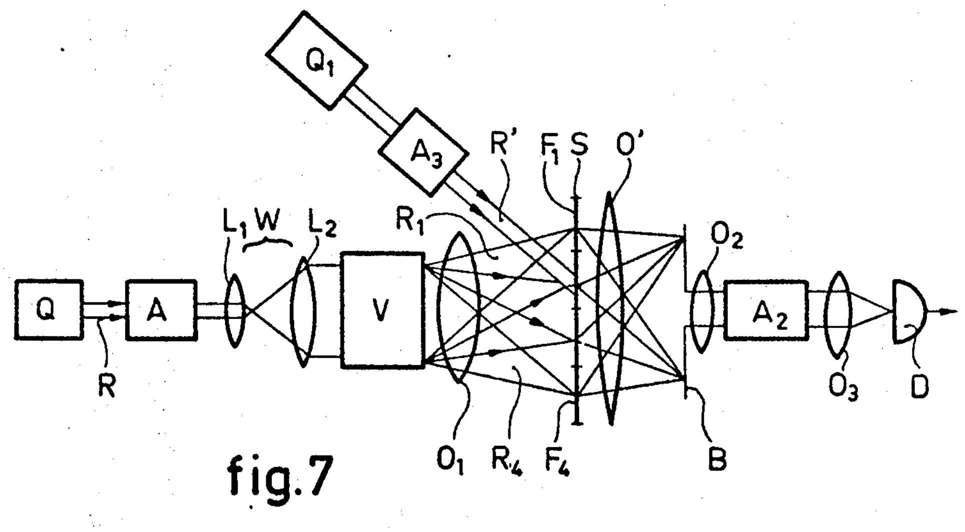
Figure 8:
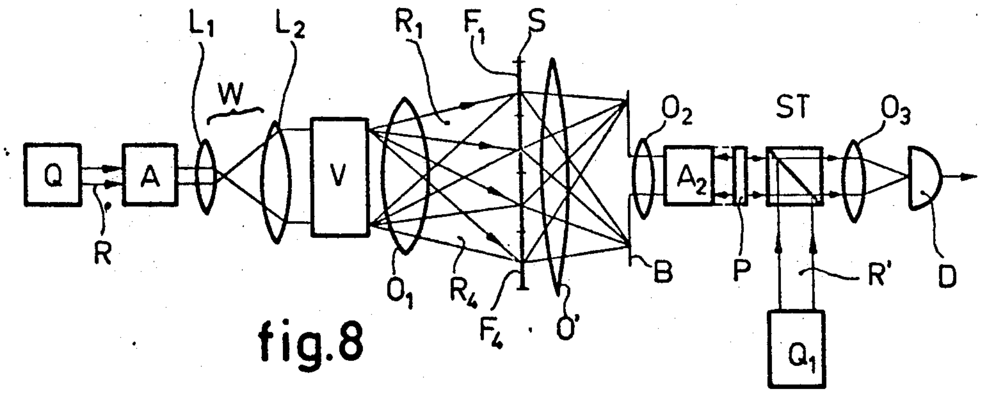

Embodiments of the invention will now be described, by way of example, with reference to the accompanying diagrammatic drawings, in which:

FIG. 1 is a block schematic diagram of an optical mass store,

FIG. 2 is a block schematic diagram of this store with the addition of a magnifying optical system, FIG. 3 shows the division of the storage plane into squares by means of a movable mask, FIG. 4 shows an arrangement for a magneto-optical storage plane, FIG. 5 shows an arrangement including an additional light-beam deflector, FIG. 6 shows an arrangement including a light guiding fibre optics system and FIGS. 7 and 8 show arrangements using a second light beam.

In FIG. 1, a beam R emitted by a source of light Q, for example a laser, first passes through a digital light-beam deflector A. Such deflectors are known. Examples are electro-optical digital light-beam deflectors which make possible random access, which is a desirable feature for many store uses, and enable access times of 2. $10^{17}$ second, as has been described in Int. Elektronische Rundschau, Vol. 21, 1967, No. 7, pages 165—168 "Anwendungen und Stand der digitalen Lichtablenkung" (Uses and state of the art of digital light-beam deflection). The beam R then passes through a multiplier V. Such multipliers are also known. For example, a particular type of multiplier substantially consists of a sequence of birefringent prisms having suitable orientations of the optic axes, as described in Applied Optics, Vol. 6, page 275 (1967) "Multiple Imaging Device Using Wollaston Prisms." An other type of multiplier utilizes the properties of holographic imaging.

During its passage through the multiplier V the beam is divided into a number N, which number is characteristic of the multiplier, of subbeams $R_1$, $R_2$, ......, $R_n$ which impinge on the storage plane S at N different positions. In the example shown in FIG. 1, N has been chosen to be equal to four. It is assumed that the storage plane S contains the information in the form of areas either permeable or impermeable to the beam R, which constitute the storage elements and the size of which is approximately equal to the cross-sectional area of the subbeams $R_i$. The deflector A is constructed so that in operation, the subbeams $R_i$ scan squares $F_i$ on the storage plane S which do not overlap. This enables one of a number of photodetectors $D_i$ each positioned behind a square $F_i$ to register the information in the square $F_i$ scanned by the subbeam $R_i$. In the embodiment shown in FIG. 1, the use of the multiplying optical system V increases the storage capacity provided by the deflector A by a factor of four.

At very high multiplications N the angular range swept by the subbeams $R_i$ may assume undesirable high values. In this case an arrangement as shown schematically in FIG. 2 has advantages. As distinct from the arrangement of FIG. 1, the light beam R emerging from the deflector A first passes through a beam-expanding optical system W, which in known manner substantially comprises two telecentric lenses or objectives $L_1$ and $L_2$. This optical system causes an increase in diameter of the beam and a simultaneous reduction in the angular range swept by the beam R, which reduction is in direct proportion to the increase in diameter.

When the subbeams $R_i$ have a diameter such as to restrict the number of storage elements available in the store, a lens or an objective $O_1$ is advantageously arranged after the multiplier V to focus the subbeams $R_i$ in the storage plane S. In this case, the number of possible storage cells which may be comprised in the storage plane S will generally be limited by the quality of the objective $O_1$. At present, there are objectives which for short-wavelength (blue) light allow resolutions of 11,000 line pairs in each dimension of an image field having a linear extent of a few centimeters This means that an optical mass store in accordance with the arrangement of FIG. 2, with due regard to the present qualities of the optical component parts, may have a storage capacity of from $10^7$ to $10^8$ bits, the access time being of the order of $10^{17}$ second. Since in the field of highly corrected objectives intensive research is being carried out, an increase in the said maximum storage capacity is to be expected. Instead of by the use of an objective $O_1$ as shown in FIG. 2, the subbeams $R_i$ may also be focused in the storage plane S by appropriate adjustment of the objective system W, abandoning the telecentric beam path. This means, however, that generally certain aberrations will have to be accepted. Whether the latter or the former method of focusing is of advantage can be decided in any individual case by means of the known methods of geometrical optics.

Material which are suitable as information carriers in optical stores are known. For permanent stores photographic layers (silver halogen and diazolayers) are suitable, but also thin metal films on transparent supports. The latter kinds are especially suitable because information can be written into them by a sufficiently powerful beam R, for example, a laser beam, without the need for a subsequent developing process, since the beam is capable of evaporating the metal film at its point of incidence thereon. Scanning is effected either by reducing the power of the beam (by means of a modulator provided internally or externally of the laser) or by sweeping it over the storage plane at a higher speed.

Of late, photochromic materials have been intensively investigated as erasable storage mediums. Furthermore, phosphors, for example SrS(Eu, Sm), are known which by the action of light of two wavelengths can be brought into two optically distinct physical states.

In all the said storage media the information must be serially written in the storage plane S, since only a single subbeam $R_i$ is allowed to reach the storage plane which is subdivided into storage elements. A simple arrangement which enables all but one of the subbeams $R_i$ to be suppressed during the write cycle is shown schematically in FIG. 3. In front of the storage plane S a mask M is moved by mechanical or electro mechanical means in a manner such that an aperture Oe in the mask uncovers one square $F_i$ at a time. The use of a mechanically moved mask M and the consequent comparatively low writing speed generally is not critical in those cases in which large quantities of information, for example tables and literature, have to be stored which have a long "lifetime" but must frequently be read.

Recently magneto-optical materials have also become known which permit a very fast write cycle. Such materials, for example gadolinium iron garnet GdIG, have the property of exhibiting an appreciable Faraday effect, even when they are in the form of thin films. Writing consists in that the respective storage element is heated by an incident light beam in the presence of a magnetic field so as to raise its temperature above the Curie-point of the material. After the beam has been switched off, the material cools to a temperature below the Curie-point, its magnetic structure being oriented in accordance with the external magnetic field. In accordance with the orientation of the magnetic field the material exhibits either a "positive" or a "negative" Faraday effect, which may be detected by scanning with a light beam according to known methods, which may include the provision of optical ancillary devices before or after the storage plane S.

FIG. 4 shows schematically an embodiment of a magneto-optical store employing a multiplier in which N=4. Behind each square $F_i$ of the magneto-optical store S are provided a photodetector $D_i$ and a controllable magnet $M_i$. By suitably controlling the magnets $M_i$ information can be written in each individual square $F_i$ independently of the remaining squares. If previous information in some of the squares is not to be erased, prior to the writing a reading process must be inserted which ensures a correct control of the respective magnets.

FIG. 5 shows a further modification of the above-described arrangement which enables the number of photodetectors to be reduced whilst retaining the same storage capacity. The storage plane S is located in the focal plane of a succeeding lens or objective $O_2$ so that the subbeams $R_i$ emerging from the storage plane S are partially collected by the objective $O_2$, as the case may be with the aid of a field lens O', and leave this objective $O_2$ as collimated beams. In accordance with the control of succeeding digital electromagnetic deflectors $A_2$ one of the subbeams $R_i$ is directed onto the photodetector D. The resolving power of the digital deflector $A_2$ must be made such as to enable individual images of all the squares $F_i$ to be produced on the detector D with the aid of an objective $O_3$. Generally, even with optimum construction of the deflector $A_2$ owing to its aperture B part of the intensity of each subbeam $R_i$ will be lost, but when a laser generator is used as a light source in most practical cases a loss factor of a few orders of magnitude is acceptable.

If after the store further nontransparent devices, for example controllable magnets in the case of magneto-optical storage layers, are to be arranged, it will not always and not for any type of storage medium be possible to produce a direct image of the storage plane S. In such cases the subbeams $R_i$ emerging from the squares $F_i$ may be advantageously collected in light-guiding fibers $T_i$, if required with the interposition of light-scattering layers, these fibers being bundled in a plane E which is readily accessible for the objective $O_2$. as is shown schematically in FIG. 6. The use of light-guiding fibers may in addition result in a reduction of the above-mentioned loss factor if the aperture of the objective $O_1$ is smaller than the maximum aperture of the light-guiding fibers.

Instead of a single photodetector D as shown in FIG. 5, generally a number L of detectors $D_i$ may be used which are so arranged after the deflector $A_2$ and the objective $O_3$ that an image of one field $F_i$ is formed on each detector $D_i$. With due regard to the known laws of optics it may be ensured that groups each consisting of L squares $F_i$ can simultaneously be read by means of the L detectors $D_i$. In a generalized embodiment of the arrangement shown schematically in FIG. 5 the detectors may be arranged in a two-dimentional pattern instead of X in a row.

In the proposed optical mass stores the use of a first deflector $A_1$ having a resolving power of N positions and of a multiplying optical system V providing Z subbeams enables a store comprising N·Z storage elements to be scanned. When a second deflector $A_2$ is to be used, its resolving power must be at least Z positions.

With respect to the writing it should be kept in mind that the Z subbeams have to store mutually independent items of information in the Z associated squares $F_i$ of the storage plane S. As follows from FIG. 3 and the respective part of the description, all but one of the subbeams may be covered by a diaphragm so that writing takes place in one square at a time. Obviously, this method is comparatively slow. Alternatively, when the storage plane consists of a magneto-optical material, for a predetermined state of the deflector $A_1$ the information from the Z squares may be read and used to adjust magnetic fields which influence the squares and are individually controllable in accordance with the information read. Only in the square in which new information has to be written the magnetic field will be oriented in accordance with its new information. When the Z subbeams then act upon the storage plane, the new information will be written in the said square whereas the information in all the remaining squares is retained. Consequently, before the information of a bit can be written into a square, one bit must be read per square.

In the proposed optical mass stores, the write time can be further reduced to the order of magnitude of microseconds per bit, so that this time is mainly determined by the storing process proper. In addition, in one of the above-mentioned proposed mass stores the required magnetic control for each individual square of the storage plane may be dispensed with and be replaced by magnetic control influencing all the squares simultaneously.

For this purpose, two controllable scanning beams for scanning the storage plane are provided which are individually controllable by means of electro-optical light deflectors.

For this purpose, FIG. 7 an optical mass store as shown in FIG. 5 includes an additional deflector $A_3$ by means of which a laser beam R' produced by a source $Q_1$ can be swept over the storage plane S. The deflector $A_3$ is designed so that the beam R' in each of its positions is exactly incident on one square $F_1$, $F_2$,.... of the storage plane S. The intensity of the subbeam of the beam R incident on this square and the intensity of the beam R' are such that during the write time the overall light beam energy operative at the location of the information to be written is sufficient to initiate the storing process. The energy of each separate beam operative during this time is, however, given a value such that it cannot initiate the storing process either here or at any other location of the storage plane. Consequently, the subbeams of the beam R incident on the remaining squares $F_i$ of the storage plane S do not initiate storing processes in these squares. Thus, with the arrangement described information can be serially written in the storage plane by purely electro-optical means without mechanically moving parts and without preceding readout processes.

As a medium for a storage plane the recently investigated MnBi may be mentioned. As has been found by several authors, thin MnBi films can be homogeneously magnetized by comparatively weak external magnetic fields, the direction of the magnetization being at right angles to the surface of the film. The direction of the polarity can be found with the aid of the Faraday-effect. Under the influence of a focused laser beam of approximately 50 milliwatts the direction of the magnetization could be reversed in small areas having a diameter of at most 1.5 $\mu m$ by an external magnetic field or by the demagnetizing field. The laser beam had to raise the temperature of the material from room temperature to a temperature above the Curie point (350° C.). Because of the thinness of the film the heating time was only a few microseconds. Since lasers for continuous wave operation having powers of several watts are known, write times of the same order of magnitude are feasible, even when dividing the intensities of the beams R and R' over many areas simultaneously.

FIG. 8 shows a further embodiment. The difference from the arrangement shown in FIG. 7 consists in that the second beam R' is not controlled by a deflector $A_3$ but is directed onto the desired square by the deflector $A_2$ used for reading. For this purpose the beam R' is introduced through a beam splitter ST into the deflector $A_2$ which it traverses in a direction opposite to that of the beam R used for reading.

When employing a usual beam splitter, for example a half-silvered mirror, part of the read beam R and a corresponding part of the beam R' may be lost. This double loss may be avoided by ensuring that the read beam R and the beam R′ each appear at the beam splitter ST in a state of linear polarization in a constant direction, the two constant directions of polarization being at right angles to one another. In this case, according to a known technique the beam splitter may be designed so that the two beams can be separated without loss of intensity. With digital light beam deflectors linearly polarized light must be used in any case so that the adjustment of the said prescribed directions of polarization is always obtainable by inserting a polarization switch P between the deflector $A_2$ and the beam splitter ST. Thus, in the case of $n$ deflection stages the deflector $A_2$ will contain $n$ birefringent elements and $(n+1)$ polarization switches will preferably form part of the deflector $A_2$ which already contains polarization switches.

In a further embodiment the beam splitter ST may take the form of a dichroic beam splitter, provided that there is a sufficient difference between the wavelengths of the two beams R and R′.

A still further embodiment of the invention enables a plurality of bits of information, especially an entire word, to be simultaneously written. In this case, the deflector $A_2$ is designed so that images of a plurality of squares of the storage plane S are produced through the deflector on a corresponding number of photodetectors. According to the invention, in the arrangement shown in FIG. 8 a light beam R′ is guided through the beam splitter ST into the deflector $A_2$ in a manner such that the beam completely corresponds to the positions and directions of the subbeams $R_i$ used for reading.

This may be effected in various manners. The beam R′ may be defocused on the storage plane S in a manner such as to cover all the squares simultaneously. However, this cannot always be carried out in a manner such that the defocused beam is simultaneously incident on the required squares only. A further possibility of shaping the beam consists in that the laser is operated in a corresponding number of modes. According to another constructionally preferred a solution, a multiplying optical system of known construction is inserted between the beam splitter ST and the laser generator $Q_1$ operated in the zero mode.

It is not absolutely necessary for the laser beams R and R′ to be produced by different sources. They may alternatively be produced by a single source.

The ratio between the required intensities of the beams R and R′ may vary within wide limits in accordance with the conditions of each individual case. Important parameters which influence these conditions are, for example, the degree of multiplication and the abruptness of the transition on the storage plane from one state to the other as a function of temperature.

What I claim is:

1. An optical mass store, comprising a storage plane divided into storage elements, an electro-optical light beam deflector, and beam-multiplying means positioned between the deflector and the storage plane for angularly separating a light beam passing through the deflector into a plurality of subbeams and for simultaneously projecting the subbeams onto the elements of the storage plane.

2. An optical mass store as claimed in claim 1, further comprising a beam-expanding optical system means positioned between the deflector and the multiplying means for increasing the diameter and decreasing the angular range of the deflected beam, whereby the angular range of the deflected beam, whereby the angular range of the subbeams is similarly decreased.

3. An optical store as claimed in claim 2, wherein the number of storage elements corresponding to the number of subbeams, further comprising an individual optical detector aligned with each storage element.

4. An optical mass store as claimed in claim 3, further comprising a diaphragm for storage element to a subbeam during the writing process.

5. An optical mass store as claimed in claim 3, wherein the storage elements are composed of a material exhibiting the Faraday effect, wherein the scanning beams and subbeams are of sufficient intensity to heat each storage element above the Curie point, and further comprising an individual controllable magnet proximate each storage element for controlling the writing of information into an associated storage element.

6. An optical mass store as claimed in claim 2, further comprising a collimating optical means for forming the light resulting from the illumination of each element by a subbeam into a plurality of parallel beams, a light-detecting element, and a second light deflector aligned with the parallel beams for selectively deflecting one of the parallel beams on the light detector.

7. An optical mass store as claimed in claim 2, wherein the storage elements are composed of a material alterable by light intensities above a predetermined threshold intensity, further comprising a source of light having an intensity less than the threshold intensity aligned with the first beam deflector, a second source of light having an intensity less than the threshold intensity, and a second light deflector positioned between the storage plane and the second source of light for selectively projecting the light from the second light source to any individual storage element, the sum of the intensities of light from the first and second light sources having an intensity above the threshold intensity.

8. An optical mass store as claimed in claim 7, further comprising a beam splitter between the second deflector and the second source of light.

9. An optical mass store as claimed in claim 8, further comprising means at the site of the beam splitter for linearly polarizing the light from the first and second light sources in planes at right angles to one another.

10. An optical mass store as claimed in claim 8, the first and second light sources have different wavelengths, and wherein the beam splitter has dichroic properties.